(12) United States Patent
Hemstock

(10) Patent No.: US 9,182,066 B2
(45) Date of Patent: Nov. 10, 2015

(54) EROSION RESISTANT FLOW CONDUIT

(71) Applicant: SPECIALIZED TECH INC., Calgary (CA)

(72) Inventor: Christopher A Hemstock, Calgary (CA)

(73) Assignee: SPECIALIZED DESANDERS INC., Calgary (CA)

( * ) Notice: Subject to any disclaimer, the term of this patent is extended or adjusted under 35 U.S.C. 154(b) by 215 days.

(21) Appl. No.: 13/720,554

(22) Filed: Dec. 19, 2012

(65) Prior Publication Data

US 2014/0166149 A1 Jun. 19, 2014

(51) Int. Cl.
| | |
|---|---|
| *F16L 55/00* | (2006.01) |
| *F16L 57/06* | (2006.01) |
| *F16L 23/16* | (2006.01) |
| *F16L 43/00* | (2006.01) |
| *G01M 3/28* | (2006.01) |

(52) U.S. Cl.
CPC .............. *F16L 57/06* (2013.01); *F16L 23/16* (2013.01); *F16L 43/002* (2013.01); *G01M 3/2861* (2013.01); *F16L 2201/30* (2013.01)

(58) Field of Classification Search
CPC .... F16L 57/06; F16L 2201/30; B65G 53/523; G01N 17/00; Y10S 138/06
USPC ...................... 138/36, 39, 104, 111
See application file for complete search history.

(56) References Cited

U.S. PATENT DOCUMENTS

| | | | | | |
|---|---|---|---|---|---|
| 2,761,311 | A | * | 9/1956 | Baker | 73/46 |
| 3,794,359 | A | * | 2/1974 | Fisher | 285/55 |
| 4,389,877 | A | * | 6/1983 | Lacey | 73/37 |
| 4,461,498 | A | * | 7/1984 | Kunsman | 285/16 |
| 4,633,913 | A | * | 1/1987 | Carty et al. | 138/147 |
| 4,644,780 | A | * | 2/1987 | Jeter | 73/40.5 R |
| 4,779,453 | A | | 10/1988 | Hopenfeld | |
| 6,129,107 | A | * | 10/2000 | Jackson | 137/312 |
| 6,520,213 | B1 | * | 2/2003 | Esser | 138/109 |
| 2009/0090424 | A1 | * | 4/2009 | Kondo et al. | 138/39 |
| 2012/0007354 | A1 | * | 1/2012 | Doig | 285/119 |
| 2012/0111418 | A1 | * | 5/2012 | Hu et al. | 137/14 |

FOREIGN PATENT DOCUMENTS

| | | |
|---|---|---|
| GB | 2312047 A | 10/1997 |
| JP | 06184564 A | 7/1994 |

OTHER PUBLICATIONS

PCT/CA2013/050695 ISR/Written Opinion (on a phone conversation on Nov. 29, 2013, the Examiner clarified that U.S. Pat. No. 4389877, GB2312047 and JPH06184564A were a "Y" reference relevant to claims 4-6 rather than 4-16.).

* cited by examiner

*Primary Examiner* — Paul R Durand
*Assistant Examiner* — Jeremy W Carroll
(74) *Attorney, Agent, or Firm* — Goodwin Law; Sean W Goodwin

(57) ABSTRACT

A particulate-accommodating fluid flow directing apparatus comprises a failure detection housing containing a flow directing insert, the housing serving as a pressure boundary; failure at any location along the insert being detectable by means associated with the housing. The insert can be manufactured of erosion resistant materials, including non-ductile materials such as ceramics. The insert is sealed to the housing at an inlet and a discharge forming a pressure chamber between the insert and housing. The pressure chamber can be maintained at a pad pressure complementary to the process pressure, the pad pressure being maintained and monitored for indication of insert failure.

24 Claims, 8 Drawing Sheets

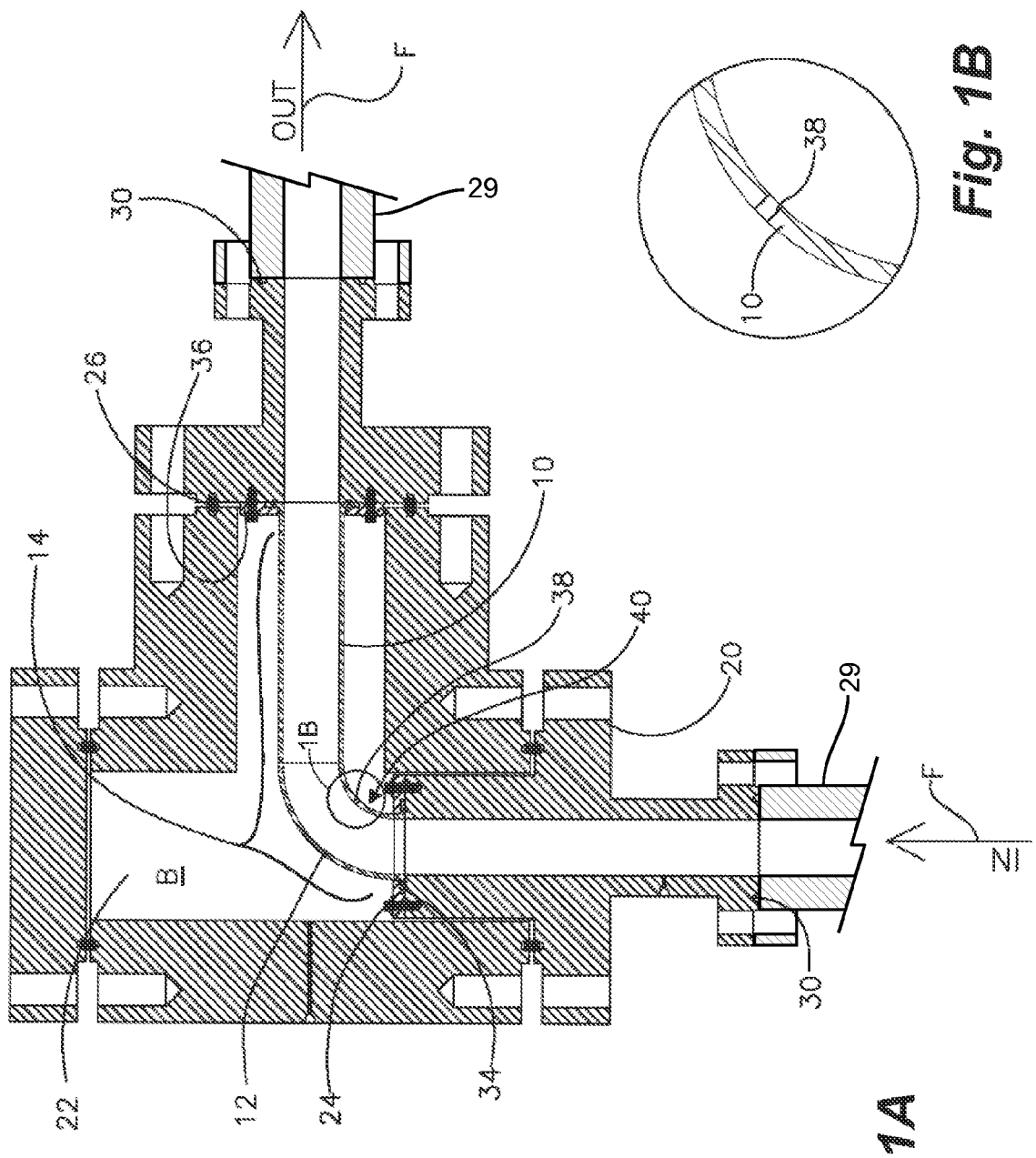

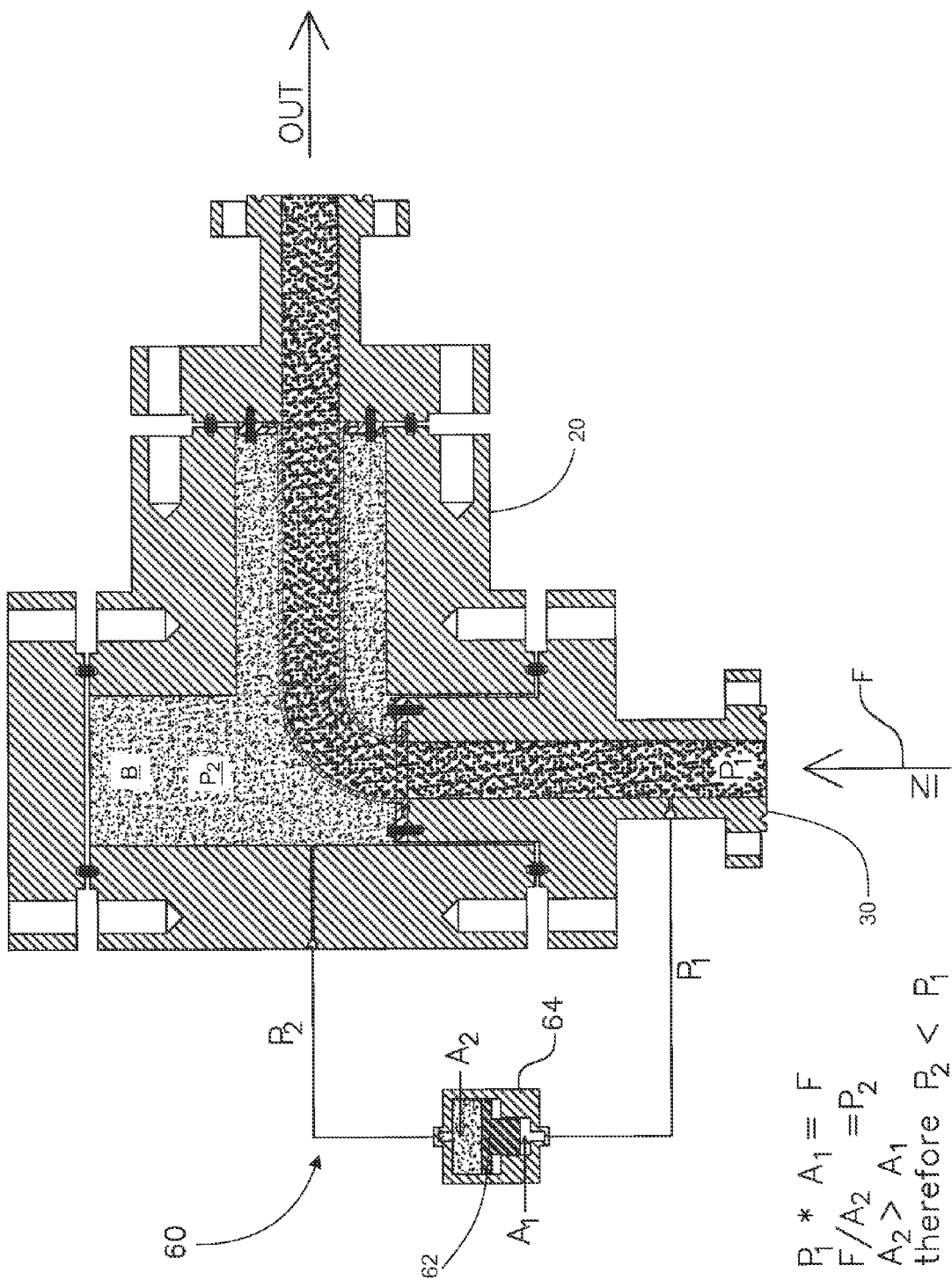

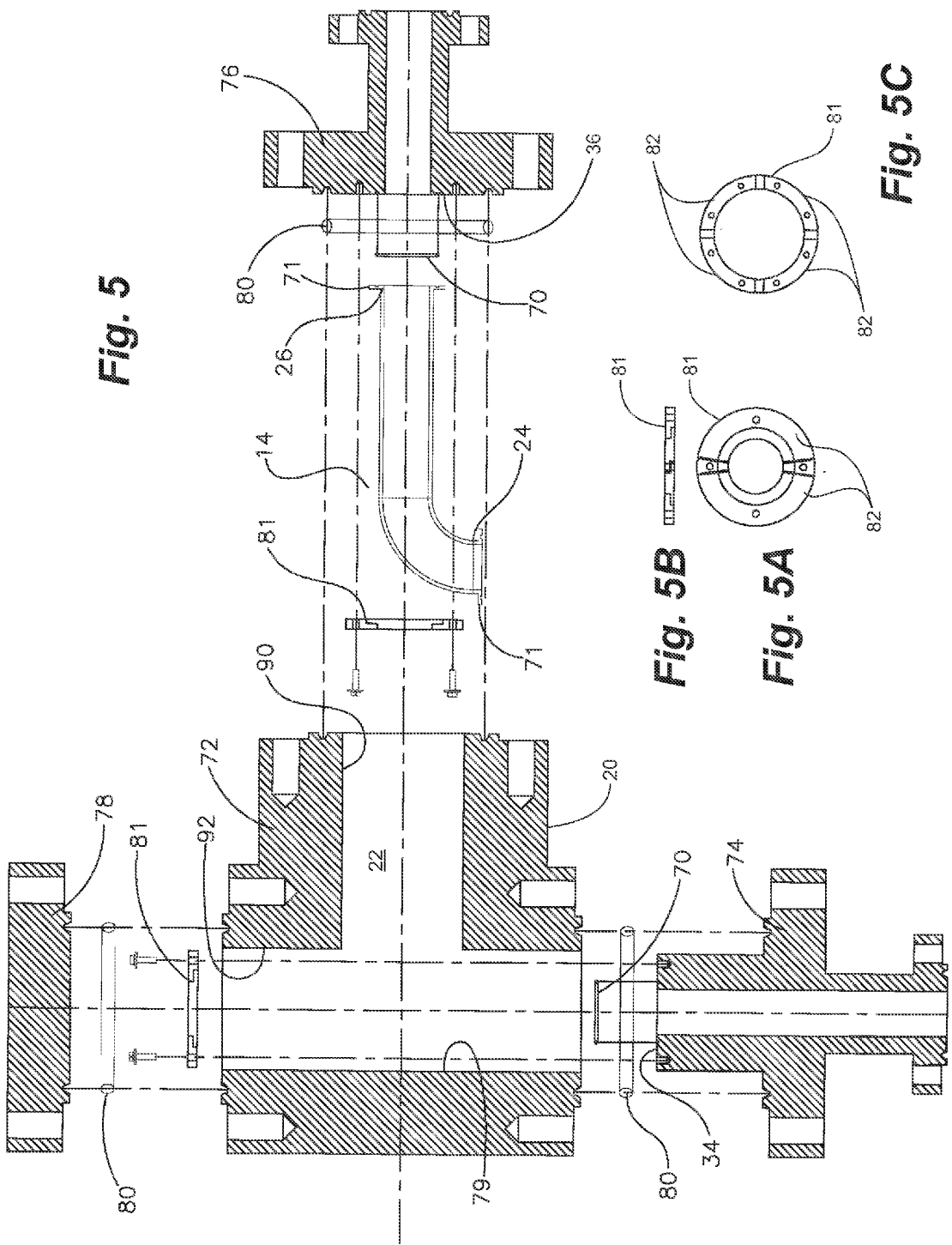

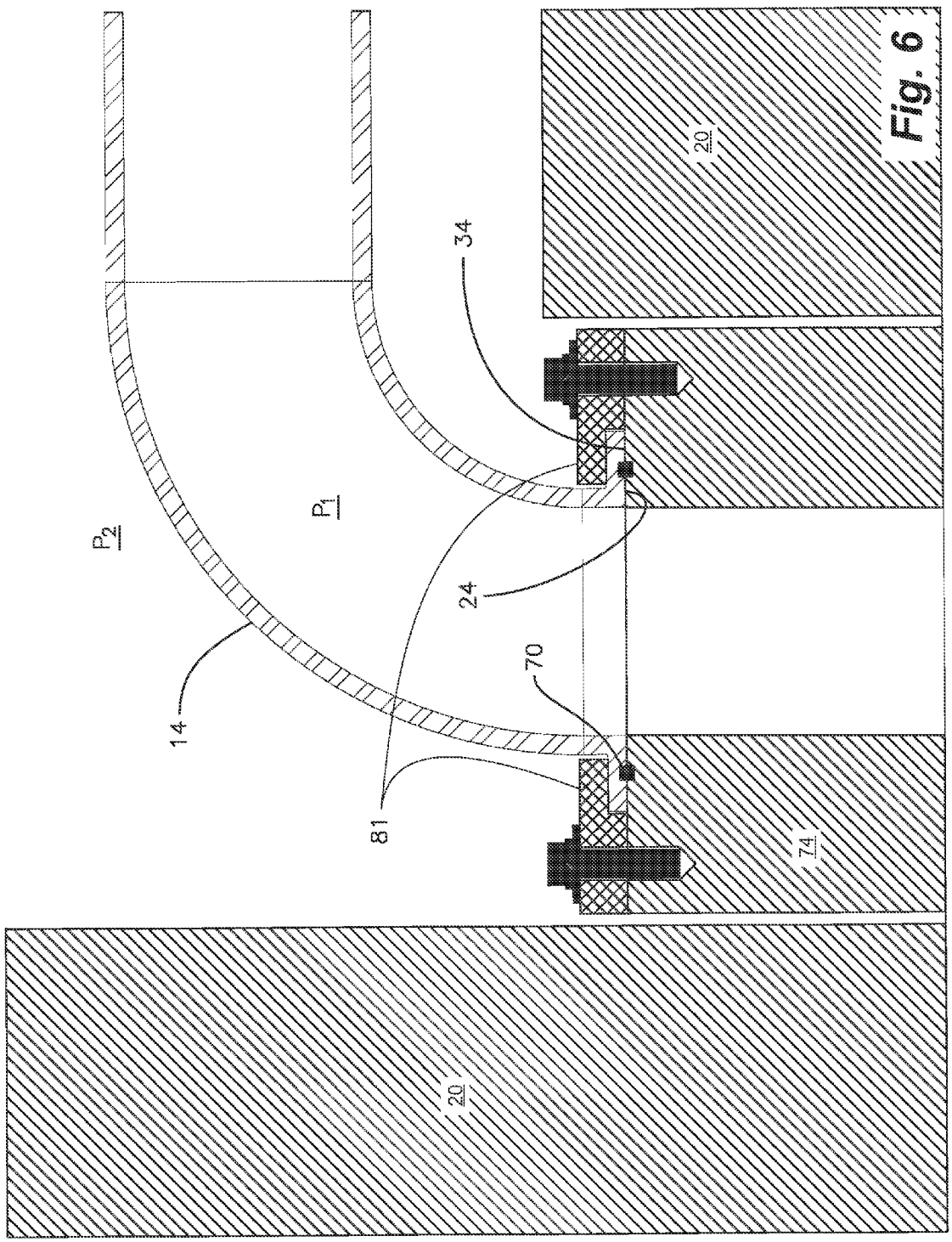

EROSION RESISTANT FLOW CONDUIT

FIELD

The disclosed embodiment relates to apparatus for fluid flow conduits for accommodating erosion prevalent in changes of direction of particulate-laden flow streams, and more particularly to an erosion resistant pipe bend insert supported within a pressure housing providing structure support of the insert and failure detection.

BACKGROUND

Gas and oil wells often produce fluids containing particulates which cause premature failures in piping. A wellhead conducts a fluid flow stream through equipment including chokes and metering apparatus. Particulates such as sand can be produced from the gas or oil formation itself or, in many cases, or introduced sand such as fracturing sand being recovered after stimulation operations. If desanding apparatus is not used, or not used long enough, upon initiating production, the sand concentration though downstream production piping causes accelerated degradation. The placement and orientation of various equipment can result in the occasional bend, including right angle or 90 degree elbows. The elbows result in a change in direction and marked increase in the erosive effect of contained particulates. When flow direction is changed in the bend, the particulates do not parallel the fluid flow, but resist a trajectory change and move against the outside of the turn, eroding the contact points. The erosions patterns in bends, tees, and blind tee connections can be complex, the ultimate point of failure from erosion being somewhat un-predictable.

Internal erosion of the piping is not readily detected until failure and failure can be catastrophic, the fluid flow such as gas being under pressure, flammable and often containing $H_2S$ which is fatal in even low concentrations. This establishes the need for a effective device.

One prior art early warning device is that disclosed in U.S. Pat. No. 7,246,825, which provides an elbow in a block having a main fluid passageway. The block further contains a matrix of passageways, separated from the main passageway by sufficient wall material that expected erosion to destruction will occur only over a reasonable operations period. The matrix of passageways is maintained at a low and differential pressure to that of the main flow stream. Erosion eventually breaks through the wall material, connecting the flow with the matrix of passageways. The matrix pressure is monitored and when the differential pressure climbs to the pressure in the process stream, breakthrough is detected and an orderly turn-around can be scheduled for replacement of the block. The matrix is rated for the process pressure. One shortcoming is that the matrix of holes have to intersect the area that was being eroded, being an uncertain science. The matrix cannot provide 100% coverage as the holes are inside the pressure boundary.

Another form of prior art apparatus includes ceramic lined pipes and machined ceramic elbows.

The ceramic material of the elbow forms part of the pressure boundary and is therefore required to have sufficient tensile strength to meet the pressure requirements. This requires special ceramics or overly thick material. As well, some regulatory codes would require special exemptions to use this material.

SUMMARY

Generally, a particulate-accommodating fluid conduit and failure detection apparatus is disclosed herein. In an embodiment, the conduit is a flow directing insert and failure detection is provided by locating the insert wholly within a failure detection housing serving as a pressure boundary; failure at any location therealong being detectable by means associated with the housing. The conduit or flow directing insert can be manufactured of erosion resistant materials, including non-ductile and ceramics not normally permitted by regulatory codes for pressure applications. The flow directing insert is wholly supported and contained within a pressure chamber of the failure detection housing. The pressure chamber and housing form a surrounding pressure boundary manufactured from conventional materials and authorized under appropriate regulatory codes for apparatus and operations under pressure. Within the pressure chamber, an intermediate fluid pad is formed about a substantial length of the flow directing insert, between the insert and the housing. The insert is sealed to the housing at an inlet and a discharge to separate the fluid flow from the fluid pad.

The fluid flow directing insert can be used in wellhead piping, typically conveying particulates and which is particularly susceptible to erosion.

In an embodiment, failure of an insert can be detected by monitoring changes in the pressure between the fluid stream and the fluid pad. Accordingly, should the flow directing insert fail at any location therealong, the fluid pad is exposed to the fluid flow and pressures equilibrate, signalling failure and need for replacement.

In other embodiments, similar inserts and housings can be provided for other challenging erosive flow arrangements including blinded tee's, reducers, and headers. Accordingly, the term flow directing insert includes a range of piping from straight runs through 90 degree elbows, a reducer also being contemplated and included herein, the fluid flow within the reducer being guided from one flow regime to another and resulting in enhanced risk of erosion.

In one aspect, flow directing apparatus is provided for conveying a fluid flow comprising a housing forming a pressure boundary, and a flow directing insert within the housing. The flow directing insert is fit sealably within the housing for forming a pressure chamber about the insert and between the insert and the housing, the insert having an inlet end for receiving the fluid flow and a discharge end for discharging the fluid flow. The insert can cause a trajectory change in the fluid flow such as a bend in the piping. The insert can be replaceable.

In another aspect, the fluid flow contains particulates and the insert is a wear resistant material, such as a non-ductile material like ceramic, resistive to erosion from the particulates.

In another aspect directed to insert failure detection, the flow directing apparatus further comprises a pressure monitor connected to the pressure chamber for detecting a pressure change in the pad pressure being indicative of failure of the insert. The process and pad pressure can be maintained at a pressure differential, the pressure differential being maintained by a make-up pressure source and may also include a regulator for introducing make-up pressure as necessary to maintain the differential pressure between the fluid flow and the pressure chamber.

In another aspect, the disclosed flow directing apparatus can be employed in wellhead piping as a flow bend, such as a 90 degree elbow.

BRIEF DESCRIPTION OF THE DRAWINGS

FIG. 1A is a cross-sectional view of one embodiment of a flow directing insert and pressure boundary housing fit into wellhead piping and having flanged connections to wellhead piping, the fasteners in this figure and others being omitted for simplicity of view;

FIG. 1B is an enlarged view of an inside bend of an insert fit with a bleed port for equilibrating supportive pressures between the fluid flow and the fluid pad;

FIG. 4 is a cross-sectional view of a pressure-differential reduction piston loop for automatic pressure maintenance of the fluid pad for a liquid-filled pressure chamber;

FIG. 5 is an exploded view of one methodology for installation of an insert for replacement or upon initial installation;

FIG. 5A through 5C are various views of an embodiment of an insert retainer ring, FIG. 5A illustrating a plan view of a retainer ring of two half-circular and overlapping rings, FIG. 5B illustrating a side view of assembled rings of FIG. 5A, and FIG. 5C illustrating yet another embodiment of a four-segmented retainer ring; and FIG. 6 is a partial cross-section view of the connection of one end of the insert to the pressure boundary housing.

BRIEF DESCRIPTION OF THE PREFERRED EMBODIMENTS

Figure 2A:
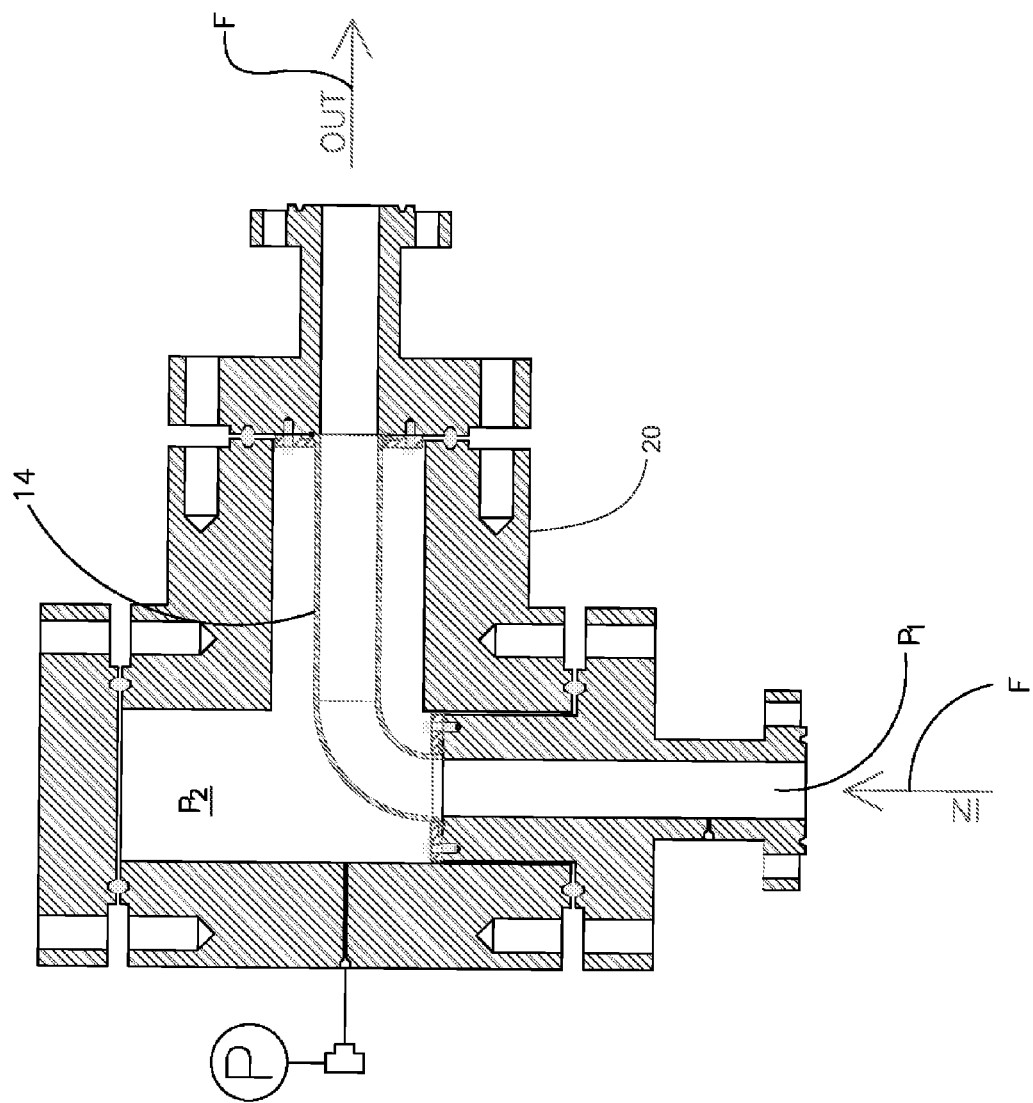
FIG. 2A is a view of one embodiment of the flow directing insert fit to a pressure boundary housing and having a pressure sensing system.

As shown in FIG. 1A, an erosion resistant conduit 10 and a pressure boundary housing 20 is disclosed herein. The housing 20 fit into wellhead piping and having flanged connections to wellhead piping 29, the fasteners in this figure and others being omitted for simplicity of view. The housing 20 supports the conduit 10 and enables detection of failure thereof. The conduit directs the flow of fluid and is exposed to the action of erosion, such as by erosive particulates contained in a process stream or fluid flow F conducted therethrough. Conduits including bends are particularly subject to accelerated erosion including aggravating factors such as the particulates impacting the bend wall, undergoing a change in momentum and the boundary layer is breached.

An extensive analysis of erosive wear in piping systems can be found in "Recommended Practice RP 0501 Erosive Wear In Piping Systems", Rev. 4.2-2007 by Det Norske Veritas.

Herein, at least a flow directing or bend portion 12 of the conduit 10 is manufactured as a flow directing insert 14 formed of erosion resistant materials, including those not normally permitted by regulations for pressure applications. Such materials include non-ductile or brittle materials.

As shown in FIGS. 1A, 2A through 5, the arrangement of the housing 20 accommodates the form of insert 14. The example flow directing insert 14 has a 90 degree bend and the housing 20 is provided with inlet and outlet ports at 90 degrees. A housing for a reducer insert would have aligned inlet and outlet ports, the housing for a 45 degree elbow having inlet and outlets oriented at 45 degrees and so on.

Such materials are firstly and generally unacceptable under regulatory codes for the instances as forming a pressure boundary to the environment, and secondly and related thereto, a failure of such materials can be catastrophic, the insert 14 is wholly supported and contained within a pressure chamber 22 of the failure detection housing 20 forming a surrounding pressure boundary that can be manufactured from conventional materials authorized under appropriate codes for pressure operations. In one aspect, pressure P1 of fluid flow F in the insert and pressure P2 of the pressure boundary can be controlled to an acceptable pressure differential dp (|P1−P2|) for controlling the magnitude of pressure-induced stresses in the insert 14. Further, in another aspect, fluid release due to failure of the insert 14 is constrained by the housing 20. As the housing 20 need not be designed for sustained fluid flow conditions, detection of a failure of the insert 14 can provided for an orderly shutdown and replacement thereof.

Responsive to both above-identified aspects, within the pressure chamber 22, an intermediate fluid pad B can be formed about a substantial length of the flow directing insert, between the insert 14 and the housing 20. The fluid pad B is maintained at a threshold pressure P2 selected to be related to, and in one embodiment, different that the fluid flow pressure P1. The insert 14 is sealed to the housing 20 at an insert inlet end 24 and an insert discharge end 26 to separate the fluid flow F from the fluid pad B. Accordingly, should the flow directing insert 14 fail at any location therealong, the fluid pad B is exposed to the fluid flow F and pressures therebetween equilibrate, signalling failure and need for replacement of the insert 14.

Pressure sensors and pressure differentials can be monitored for signalling failure and, in one embodiment, for initiating closure of an emergency shutdown (ESD) valve located in the piping upstream of the insert 14, such as that in wellhead piping between the wellhead and the housing 20. In other embodiments, an alarm can alert an operator of the need for remedial action.

In an embodiment, one suitable material for the flow directing insert 14 is a highly erosion resistant material such as that selected from the ceramics. Such materials are typically brittle and unsuitable for use as the pressure boundary in pressure applications according to applicable codes. One material that is usable includes silicon nitrile which is conventionally cost prohibitive when forming the entirely of a commercial structure. Other lower cost ceramics are quite brittle and are not listed in the various codes for pressure containment including NACE, ASME, CSA. As a consequence, use of such materials usually requires special applications and permission before use in a pressurized environment.

Herein, the pressure boundary is formed by manufacture of the housing of conventional fluid pressure containment materials. The housing 20, such as one manufactured from steel, has an inlet interface 30, shown as an inlet flange to the upstream fluid piping and a discharge interface 32, shown as a discharge flange to the downstream fluid stream piping. The flow directing insert 14, possibly formed from unlisted materials, are wholly within the housing 20. The insert 14 is sealed to the housing 20 at an inlet seal 34 at the inlet 24 and at a discharge seal 36 at the discharge 26, maintaining separation between the fluid flow F and the fluid pad B. The fluid flow F then enters the housing at the inlet interface flange 30 and flows through the flow directing insert 14, sealed from the fluid pad B at the inlet seal 34. Fluid flow exits the flow directing insert 14, sealed from the fluid pad at insert discharge seal 36. Finally, the fluid flow exits the housing 20, sealed from the environment at the discharge interface flange 32.

Brittle materials are typically unsuitable for pressure operations as they cannot withstand the tensile stresses resulting from pressure differentials imposed thereon. By maintaining pressure both within and without the insert, and a pressures not too dissimilar to one another, stresses are minimized or eliminated.

Accordingly, the flow directing insert 14, such as that manufactured of brittle material, is immersed in the fluid pad B at pad pressure boundary pressures P2 near those at the process flow conditions P1, limiting the pressure differential (P1−P2) across the insert 14.

In one embodiment, and with reference to FIG. 1B, the pad pressure P2 can be balanced to the fluid flow pressure P1 by placing a bleed port 38 in the insert 14 on an erosion-protected area, such as on the inside bend 40, the bleed port having a restricted flow therethrough. Fluid from the fluid flow F will bleed through the bleed port 38 into the fluid pad B, balancing the pressure (P1=P2) across the insert, eliminating differential pressure stresses and minimizing stress overall.

With reference to FIG. 2A, so as to enable detection of a failure along the insert, the pad pressure can be set to a threshold pressure P2, any change therein, particular that approaching process pressure P1 signaling a failure.

Figure 2B:
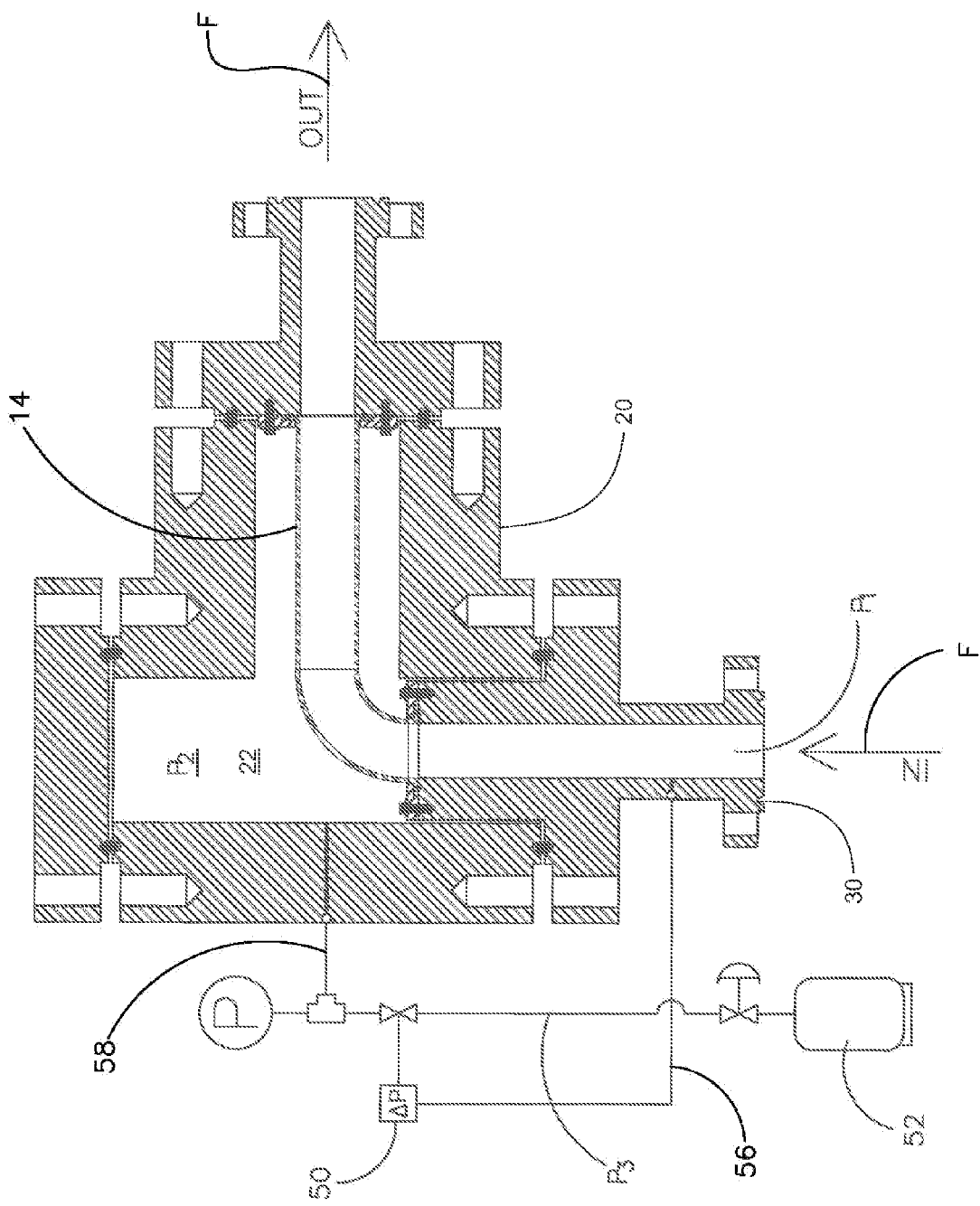
FIG. 2B is a view of one embodiment of the flow directing insert fit to a pressure boundary housing and having a pressure sensing and differential pressure maintenance system.

Further, and with reference to FIG. 2B, in another embodiment, so as to enable detection of failure along the insert, the pad pressure P2 can be set to a threshold pressure that is different from that of the process pressure P1; a differential pressure dP (dp< >0) of about 100 psi (700 kPa) is deemed sufficient to detect a breach. Upon failure anywhere thereafter, the pad P2 pressure will equilibrate with the gas process pressure P1 and P1−P2 with be about zero (|dp|=0). A pressure monitor or pressure monitoring devices, such as a pressure transducer or transducers, can have a set point for differential pressure between process and pad pressures or for a change in pad pressure.

Alternatively, the pad pressure P2 can be controlled using a regulator 50 using the process pressure P1 as a reference pressure, the regulator increasing the fluid pressure P2 in the pressure chamber as the process pressure P1 increases. The process pressure P1 can be tapped into the fluid flow F. As shown, P1 is monitored at about the inlet interface 30. A differential pressure can be maintained, such as a lower pad pressure P2 to a higher process pressure P1. Failure of the insert would cause the pad pressure P2 to rise, signalling failure. A pressurized source 52 of pad fluid B, or pressure connected to the pad fluid, is provided to regulate a make-up pressure P3 to the pad pressure. In another embodiment, the pad fluid is an incompressible fluid such as a liquid.

Figure 3A:
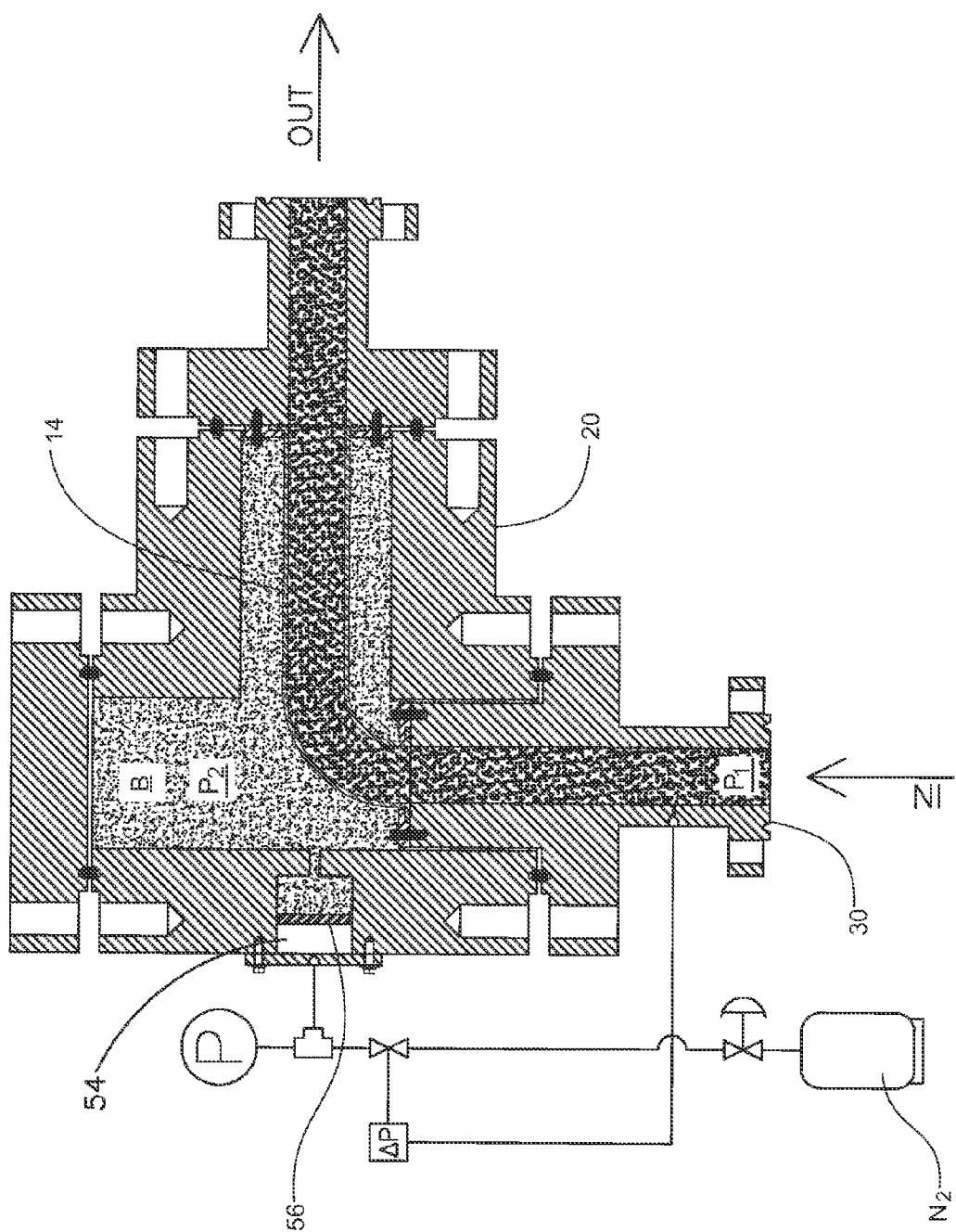
FIG. 3A is a cross-sectional view of a liquid accumulator located in the pressure housing for pressure maintenance against a fluid pad for a liquid-filled pressure chamber for the pressure boundary housing.

As shown in FIG. 3A, so as isolate the source fluid of the make-up pressure from the pad fluid, the system can further include an intermediate isolation chamber 54. The pad fluid can be a liquid which is to be separated from a gaseous pressure maintenance fluid or gas. The chamber 54 and make-up source act as a form of liquid accumulator. The chamber 54 forms a cylinder that can be incorporated into the housing 20. Regulated make-up pressure P3 can drive a piston 56, movable within the chamber 54, to displace pad fluid to and from fluid pad B and necessarily vary the fluid pad pressure P2 as process pressure P1 varies inside the flow directing insert 14. The pressurized source of make-up pressure P3 can be supplied by a pressure tank or bottle having pressurized fluid within such as gaseous nitrogen (N2).

Figure 3B:
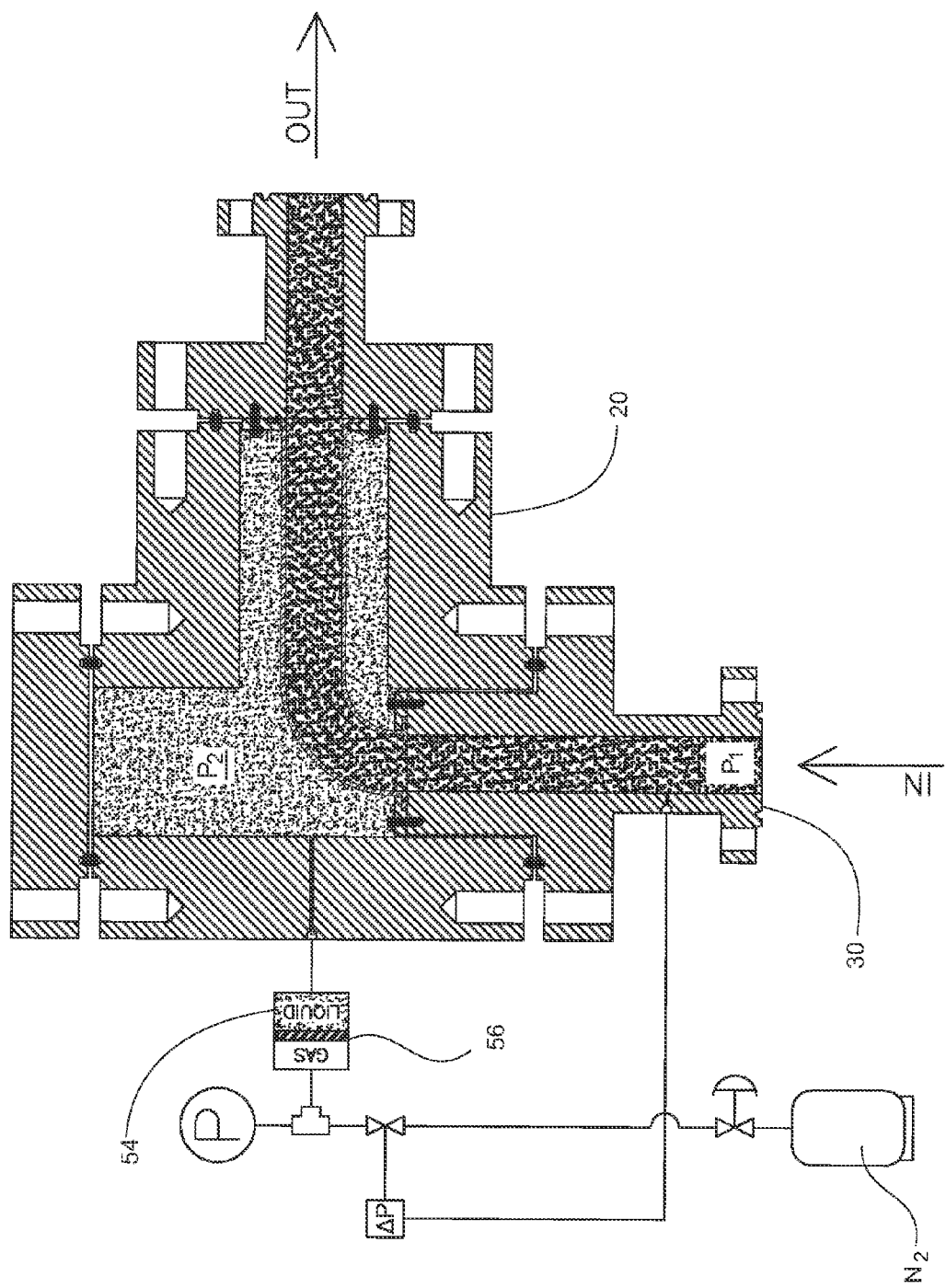
FIG. 3B is a cross-sectional view of an optional liquid accumulator as a device separate from the pressure housing.

As shown in FIG. 3B, the isolation chamber 54 can alternatively be located external to the housing 20.

Turning to the FIG. 4, one can eliminate need for a regulator using a pressure-differential reduction piston loop 60 comprising a stepped piston 62 and wherein the intermediate chamber is corresponding stepped cylinder 64. Process pressure P1 of the fluid flow F, through process connection 56 to the fluid flow F, is in fluid communication with and acts on a first smaller area A1 of stepped piston 62 in stepped cylinder 64 to produce force F. Force F acts on a larger second area A2 of the stepped piston 62, which is in fluid communication with, and producing a fluid pressure P2 on the fluid pad side, fluidly connected through pad connection 58 to the pressure chamber 22. Accordingly, the fluid pressure P2 is automatically maintained at a pressure lower than the process pressure P1. As the process pressure P1 varies, so does the fluid pad pressure P2, only at a lower, and differential, pressure dP.

With reference to FIG. 5, the insert 14 is removably installable into the housing 20 and replaceable. The insert 14 is sealed to the housing 20 using end ring seals 70, 70 between each of the insert's inlet and discharge ends 24,26, and an inside of the housing. The seals 70,70 seal the insert 14 to the housing and separate the fluid flow F from the fluid pad B.

In an embodiment, the housing's pressure chamber 22 houses the insert 14 and forms a first annular base to which the inlet end 24 of the insert is fit, a ring seal 70 being located therebetween. The first annular base is aligned with, and formed about, the inlet interface 34. A second annular base is provided at the discharge interface for sealing with the other discharge end 26 of the insert 14. A second ring seal 70 located therebetween. In this embodiment the inlet and discharge ends 24,26 of the insert 14 are formed with flanges 71 for corresponding placement and sandwiching of the ring seal 70 between the insert 14 and the housing 20.

As shown in the exploded view of FIG. 5, for installation of an insert 14 into the housing 20, the housing can be formed in four components, a main body 72, an inlet body 74, a discharge body 76, and an access closure 78.

The insert 14 can be initially fit to the discharge body 76 and installed through an outlet port 90 of the main body 20. The discharge body 76 is sealed thereto using conventional flange ring seal 80. The flanged discharge end of the insert 14 is secured to the discharge body 76 using an insert seal 70 and a retainer ring 81. That portion of the discharge body 76 within the pressure chamber 22 forms the discharge interface 36. The retainer ring 81 clamps the insert's flange 71 to the discharge interface 36 of the discharge body 76. With reference to FIGS. 5A, 5B and 5C, the retainer ring 81 can be configured in one of a variety of two or more sectional pieces 82, as known in the art, so as to be arranged about the insert, yet form a substantially continuous clamp about the flange 71. FIG. 5A illustrates two sectional pieces while FIG. 5C shows four sectional pieces. The sectional pieces overlap and fasteners secure them together and to the underlying structure.

The inlet body 14 can be fit to an inlet port 79 of the main body 20 and sealed thereto using conventional flange ring seal 80 for forming a sealed housing 20. That portion of the inlet body within the pressure chamber 22 forms the inlet interface 34. The inlet end 24 of the insert 14 can be guided through an outlet port 90, aligning the inlet end of the insert with the inlet interface 34.

As shown in better detail in FIG. 6, an insert ring seal 70 is arranged between the inlet end 24 of the insert 14 and the inlet interface 34. A retainer ring 81 can be guided through an access port 90 for clamping the insert's flange 71 to the inlet interface 34.

Once the inlet end 24 of the insert 14 is secured, the access closure 78 can be secured to the main body 72 to seal the access port 92 and form the pressure chamber 22.

The housing 20 is now closed to seal and form the fluid pad B. The housing closure is sealed and re-closable for permitting installation and replacement of the flow directing insert 14.

The arrangement for the inlet and outlet is arbitrary and can be reversed.

The embodiments of the invention in which an exclusive property or privilege is claimed are defined as follows:

1. A flow directing apparatus for conveying a fluid flow having a process pressure, the apparatus comprising:
    a housing forming a pressure boundary;
    a flow directing insert fit sealably and wholly within the housing for forming a pressure chamber about the insert and between the insert and the housing, the insert having an inlet end for receiving the fluid flow and a discharge end for discharging the fluid flow,
    wherein the pressure chamber comprises pad fluid at a pad pressure, and the pad pressure is controlled such that the differential between the pad pressure and the process pressure limits the magnitude of pressure-induced stress in the insert;
    a pressure source in fluid communication with the pressure chamber;
    a pressure monitor for monitoring the pressure differential between the process pressure and pad pressure; and
    a regulator controlling the pressure source for maintaining the pad pressure relative to the process pressure in response to the process pressure monitored by the pressure monitor.

2. The flow directing apparatus of claim 1 wherein the insert is replaceable.

3. The flow directing apparatus of claim 1 wherein:
    the inlet end is sealed to the housing at an inlet seal; and
    the discharge end is sealed to the housing at a discharge seal.

4. The flow directing apparatus of claim 1 wherein:
    the fluid flow contains particulates; and
    the insert is a wear resistant material resistive to erosion from the particulates.

5. The flow directing apparatus of claim 4 wherein the wear resistant material is a non-ductile or brittle material.

6. The flow directing apparatus of claim 5 wherein the wear resistant material is a ceramic.

7. The flow directing apparatus of claim 1 wherein said regulator introduces a pressure from the pressure source as necessary, in response to the pressure differential monitored by the pressure monitor, so as to maintain the pressure differential between the fluid flow and the pressure chamber.

8. The flow directing apparatus of claim 1 wherein the pressure chamber contains a fluid pad of liquid.

9. The flow directing apparatus of claim 8 wherein the pressure source contains gas, and wherein the regulator comprises:
    an isolation chamber fluidly connected between the pressure source and the fluid pad, the isolation chamber forming a cylinder and having a piston movable therein, the piston being positioned intermediate the pressure source and the fluid pad of liquid.

10. The flow directing apparatus of claim 8 wherein:
    an isolation chamber forms a stepped cylinder having a stepped piston moveable therein; wherein
    the piston has a first smaller area in fluid communication with the fluid flow for receiving the process pressure and a larger second area in fluid communication with the liquid of the fluid pad for automatically maintaining the pad pressure at a pressure lower than the process pressure.

11. An erosion resistant flow conduit comprising:
    a wellhead piping;
    a flow bend in said wellhead piping, said flow bend comprising the flow directing apparatus of claim 1.

12. The flow directing apparatus of claim 1 wherein the housing comprises:
    a body having at least a first sealable opening thereon; and
    at least a first port body having an opening thereon, said first port body fitting to the first opening for forming a first port and for securing and sealably fitting the discharge end of the insert to the first port.

13. The flow directing apparatus of claim 12 wherein said body further has a second sealable opening thereon, and wherein said housing further comprises:
    a second port body having an opening thereon, said second port body fitting to the second opening for forming a second port and for securing and sealably fitting the inlet end of the insert to the second port; the housing forming a pressure boundary between the first and second ports and the insert being fit sealably within the housing between the first and second ports.

14. The flow directing apparatus of claim 13 wherein said housing further comprises:
    a third sealable opening on the body for accessing the insert.

15. The flow directing apparatus of claim 14 wherein said housing further comprises a third port body securing and sealably fitting the third opening.

16. The flow directing apparatus of claim 13 wherein:
    the first port is an outlet port;
    the second port is an inlet port; and
    fluid flow from the inlet port flows to the first end of the insert and the outlet port receives fluid flow from the second end of the insert.

17. The flow directing apparatus of claim 13 wherein the discharge end of the insert is secured and sealably fit to the first port body.

18. The flow directing apparatus of claim 17 wherein the discharge end of the insert further comprises a flange for securing and sealably fitting to the first port body.

19. The flow directing apparatus of claim 18 wherein the flange of the discharge end of the insert is sealably secured to the first port body using a ring seal and a retainer ring.

20. The flow directing apparatus of claim 19 wherein said retainer ring comprises two or more sectional pieces for arrangement about the insert.

21. The flow directing apparatus of claim 17 wherein the inlet end of the insert is secured and sealably fit to the second port body.

22. The flow directing apparatus of claim 21 wherein the inlet end of the insert further comprises a flange for securing and sealably fitting to the second port body.

23. The flow directing apparatus of claim 22 wherein the flange of the inlet end of the insert is sealably secured to the second port body using a ring seal and a retainer ring.

24. The flow directing apparatus of claim 23 wherein said retainer ring comprises two or more sectional pieces for arrangement about the insert.

* * * * *